United States Patent Office 3,262,793
Patented July 26, 1966

3,262,793
REFRACTORY
Joseph E. Neely, Los Gatos, Jacques R. Martinet, San Jose, and Jan Bowman, Los Gatos, Calif., assignors to Kaiser Aluminum & Chemical Corporation, Oakland, Calif., a corporation of Delaware
No Drawing. Filed Nov. 12, 1963, Ser. No. 323,094
9 Claims. (Cl. 106—55)

This invention concerns refractory compositions and particularly such compositions wherein the major constituent is a basic or nonacid material.

Although the bulk of refractories used to construct industrial furnaces such as blast furnaces, open hearth furnaces, cement kilns, electric arc furnaces and the like, are used in the form of shaped blocks, for example bricks in either the fired or unfired (i.e., chemically bonded) state, there has been, particularly in recent years, an increasing use of refractory materials in the loose or granular form. One very common way of using such loose or granular refractories is by gunning. In this process the granular material is ejected through a nozzle at which it is wet with a relatively small but controlled amount of water, the wetted material impinging on a wall or other surface to be coated with the refractory.

One characteristic which is essential in a gunning mix is that of rapidly forming a bond or set at room temperature. It can be appreciated that a mixture gunned onto a vertical wall must also have sufficient coherence immediately upon impact to stick to the wall and hold itself in position on the vertical surface. Further, any subsequent material deposited on top of freshly gunned material must stick to that material and not drop off the wall or rebound therefrom.

One material which has been widely used as a constituent of gunning mixes as a binder or cold setting or room temperature bond or cement is sodium silicate. This material is a water soluble mixture of sodium oxide ($Na_2O$) and silicon dioxide ($SiO_2$) and is available commercially in a range of chemical compositions with differing amounts of $Na_2O$ and $SiO_2$. For at least two reasons it is desirable to use a sodium silicate of high silica content (i.e., a sodium silicate with at least two parts by weight of $SiO_2$ for each part by weight of $Na_2O$). First, the use of a material with less soda and more silica results in a generally more refractory overall product. Second, material of higher silica content is more readily available and less expensive. However, these high silica materials have certain disadvantages. They are more slowly soluble in water than sodium silicates with lower $SiO_2$ content (and accordingly higher $Na_2O$ content). This is clearly disadvantageous for a gunning mix. In addition, high silica sodium silicates are slower in setting to a hard bond.

It has now been discovered that a rapid dissolution of the bonding agent, and consequent rapid setting, is obtained, along with or simultaneously with good initial strength, by employing in a refractory gunning mix which includes a refractory aggregate, preferably a nonacid refractory aggregate, and from 1% to 5% bentonite, a bond consisting essentially of from 1% to 5% of the total weight of the mix of a sodium silicate having a high silica content (i.e., at least two parts by weight of $SiO_2$ for each part by weight of $Na_2O$) and from 0.2% to 1.2% of the total weight of the mix of an alkali metal phosphate, particularly a polyphosphate, soluble in water.

The refractory grain used in the practice of this invention can be any dense granular refractory material of suitable sizing, as is well known in the art. In general, the grain sizing is chosen so that it comprises a mixture of particles in graded sizes selected to produce densest packing in a product made therefrom. The binder of this invention is particularly useful in gunning mixes made with nonacid refractory grain such as those made from periclase, deadburned magnesite, deadburned dolomite, chromite ore, and mixtures of these with each other. However, the bonds of this invention can also be used with "acid" refractory grains such as calcined fireclay, calcined bauxite, aluminum oxide, and the like.

The sodium silicates used in the practice of this invention will generally be used in the form of powders. These powders can be anhydrous or partially or totally hydrated. Thus, for example, a typical sodium silicate with $Na_2O:SiO_2$ ratio of 1:2 has a chemical analysis as follows: $Na_2O$ 27.0%, $SiO_2$ 54.0%, $H_2O$ 18.0%, the remaining 0.5% being impurities.

The phosphates used in this invention can be any water soluble alkali metal phosphate. Generally, the sodium phosphates will be preferred materials because of their ready availability and relatively low cost, compared with other alkali metal phosphates. A preferred class of phosphates are the polyphosphates, generally designated by the chemical formula $M_{n+2}P_nO_{3n+1}$ where M is an alkali metal, for example sodium, and $n$ is an integer. Examples of specific materials in this preferred group are sodium tripolyphosphate, $Na_5P_3O_{10}$ (wherein $n=3$ in the general formula given above) and tetrasodium pyrophosphate, $Na_4P_2O_7$ (wherein $n=2$ in the general formula).

It will be understood that the bentonites used in this invention are used in their raw or uncalcined or unfired state. These bentonite clays are known for their colloidal or hydrophilic properties. A preferred class of materials is the so-called swelling bentonites, such as those obtained from Wyoming.

While the precise nature of the physical and chemical interaction of the mixed bond of this invention is not completely understood, it is believed that the addition of a soluble alkali metal phosphate to a high silica sodium silicate results in a more rapid solution of the high silica material than is possible when that material alone is mixed with water. It will be clear that, in order to form a bond which will unite the refractory particles of the compositions of this invention, the sodium silicate present must first be brought into solution in the tempering liquid. It will also be clear that, in general, the more quickly the sodium silicate is dissolved, particularly in the case of a gunning mix, the better the results obtained. In addition, it has been found that the use of the soluble alkali metal phosphate with the high silica sodium silicate hastens the setting of the sodium silicate to a coherent bond. With regard to the bentonite, it is believed that the soluble alkali metal phosphate acts to more rapidly wet the bentonite, making it sticky so that more gunned material sticks on a vertical surface and a greater thickness of refractory lining can be built up at one time.

While compositions of this invention can be gunned on hot or cold furnace structures, they are particularly advantageous for gunning on cold surfaces in that, when gunned by well-known techniques, they form an unusually adherent material which permits the building up of a relatively great thickness of gunned material on a vertical surface. Another advantage is that they provide a rapid set in the cold state. A further advantage is that the compositions permit the use of sodium silicates which, heretofore, were too slowly soluble for use in gunning mixes. The following examples illustrate the manner of practicing this invention and are intended to be illustrative, and not limiting, of the invention.

Example I

The following composition:

| | Percent |
|---|---|
| Periclase | 13.0 |
| Chrome ore | 82.7 |
| Bentonite | 2.0 |
| Sodium silicate ($Na_2O:SiO_2 = 1:2$) | 1.9 |
| Sodium tripolyphosphate | 0.4 | was mixed with about 11% water in a Ridley gun, as is well known in the art, and projected onto the vertical surface of a furnace. The chrome ore all passed a 4 mesh screen, 57% was retained on a 48 mesh screen, and 14% passed a 200 mesh screen. The periclase all passed a 28 mesh screen and 62% passed a 200 mesh screen. This mix showed little dusting during gunning and it was possible to build up a coating thickness of about 9 inches of gunned material. The bulk density of the gunned material (after drying at 150° C.) was 156.7 lbs./ft.$^3$. Another mix was made up of the above ingredients in the same proportions except that the Na tripolyphosphate was omitted and 3.5% of the same sodium silicate used and was placed on a furnace surface in exactly the same way. In this latter test, there was a larger amount of dusting and rebound of the material and slumping occurred when as little as 4 or 5 inches thickness had been placed on the vertical wall.

Example II

A mixture of the following composition: 1.9% sodium silicate ($Na_2O:SiO_2$ ratio 1:3.22), 0.5% sodium tripolyphosphate, 2% bentonite, the balance being periclase grain all of which passed a 4 mesh screen and 43% of which passed a 48 mesh screen, was gunned with the addition of about 12% water at the gunning nozzle onto a hot furnace wall, where it formed a strong, adherent surface. The sodium silicate used in this example had the following composition: $SiO_2$, 61.8%; $Na_2O$, 19.2%; $H_2O$, 18.5%; impurities, 0.5%.

It will be understood that mixtures according to the present invention can also contain other compatible ingredients well-known to those skilled in the art. For example, they can contain a hydration inhibitor such as an anhydrous borate, or a flux to assist in forming a high temperature or ceramic bond, millscale, fayalite, aluminum oxide, and volatilized silica, being well-known examples. The mixture can also contain, if desired, compatible cold bonding agents such as magnesium salts or tar or pitch. Any desired admixture of such additives can be employed.

In the specification and claims, percentages and parts are by weight unless otherwise indicated. Analyses of mineral components are reported in the usual manner, expressed as simple oxides, e.g., $SiO_2$, $MgO$, etc., although the components may actually be present in various combination, e.g., as a magnesium silicate. Mesh sizes referred to herein are Tyler standard screen sizes which are defined in Chemical Engineers' Handbook, John H. Perry, editor-in-chief, third edition, 1950, published by McGraw-Hill Book Company, at page 963. For example, a size passing a 100 mesh screen corresponds to 147 microns, and that passing 200 mesh, to 74 microns.

Having now described the invention, what is claimed is:

1. In a refractory composition consisting essentially of nonacid refractory grain, a bond, and from 1% to 5% bentonite, the improved bond consisting essentially of a major portion of sodium silicate having at least two parts by weight of $SiO_2$ for every part by weight of $Na_2O$, and a minor portion of an alkali metal phosphate soluble in water.

2. A refractory gunning composition consisting essentially of from 1% to 5% by weight of a sodium silicate having at least two parts by weight of $SiO_2$ for each part by weight of $Na_2O$, from 0.2% to 1.2% of a water soluble alkali metal phosphate, from 1% to 5% bentonite, the balance being refractory grain.

3. A refractory gunning composition according to claim 2 wherein said refractory grain is nonacid refractory grain.

4. A refractory gunning mix according to claim 3 wherein said nonacid refractory grain is periclase.

5. A refractory gunning composition according to claim 2 wherein said alkali metal phosphate is a polyphosphate.

6. A refractory gunning composition according to claim 5 wherein said polyphosphate is a sodium polyphosphate.

7. A refractory gunning composition according to claim 6 wherein said sodium polyphosphate is sodium tripolyphosphate.

8. A refractory gunning composition consisting essentially of from 1% to 5% by weight sodium silicate having at least two parts by weight of $SiO_2$ for each part by weight of $Na_2O$, 0.2% to 1.2% of sodium tripolyphosphate, from 1% to 5% bentonite, the balance being nonacid refractory grain.

9. A refractory gunning composition consisting essentially of from 1% to 5% by weight sodium silicate having two parts by weight of $SiO_2$ for each part by weight $Na_2O$, from 0.2% to 1.2% sodium tripolyphosphate, from 1% to 5% bentonite, the balance being nonacid refractory grain.

References Cited by the Examiner

UNITED STATES PATENTS

| 3,093,497 | 6/1963 | Demaison | 106—66 |
| 3,199,995 | 8/1965 | King et al. | 106—58 |
| 3,208,861 | 9/1965 | Henry et al. | 106—58 |

TOBIAS E. LEVOW, *Primary Examiner.*

J. POER, *Assistant Examiner.*